United States Patent [19]

Lambertus

[11] Patent Number: 5,018,273
[45] Date of Patent: May 28, 1991

[54] PROCESS FOR PRODUCING AN ORIFICE PLATE FOR PELLETIZING OF PLASTICS

[75] Inventor: Friedrich Lambertus, Stuttgart, Fed. Rep. of Germany

[73] Assignee: Werner & Pfleiderer GmbH, Fed. Rep. of Germany

[21] Appl. No.: 582,240

[22] Filed: Sep. 13, 1990

[30] Foreign Application Priority Data

Oct. 17, 1989 [DE] Fed. Rep. of Germany ....... 3934596

[51] Int. Cl.$^5$ ............................................. B21D 53/00
[52] U.S. Cl. .............................. 29/890.142; 29/890.14
[58] Field of Search ............. 29/890.01, 890.09, 890.1, 29/890.142, 890.143, 419.1, 557; 425/464, DIG. 230

[56] References Cited

U.S. PATENT DOCUMENTS

| | | | |
|---|---|---|---|
| 4,535,518 | 8/1985 | Jaqua | 29/890.01 |
| 4,745,670 | 5/1988 | Morris | 29/890.142 |
| 4,934,916 | 6/1990 | Lambertus | 425/DIG. 230 |

*Primary Examiner*—P. W. Echols
*Assistant Examiner*—David P. Bryant
*Attorney, Agent, or Firm*—Ladas & Parry

[57] ABSTRACT

A process for the manufacture of an orifice plate for pelletizing of plastics in which inserts are inserted into corresponding recesses in the orifice plate, the inserts being formed with blind bores before their insertion into the recesses. The blind bores terminate in proximity to the outer surface of the inserts and after soldering of the inserts into the recesses and hardening of the inserts, the outer surface of the base plate and of the inserts are ground down to expose the blind bores and form a planar outer surface for the orifice plate.

13 Claims, 1 Drawing Sheet

PROCESS FOR PRODUCING AN ORIFICE PLATE FOR PELLETIZING OF PLASTICS

FIELD OF THE INVENTION

The invention relates to a process for the production of an orifice plate for pelletizing plastics. More particularly, the invention relates to a process in which an insert is fixed in a recess in a base plate to form the orifice plate and plastic melt is caused to flow through a melt channel in the base plate and then through a bore in the insert for discharge at an outer surface of the insert.

BACKGROUND AND PRIOR ART

Orifice plates for the dry, wet, or underwater pelletizing process for plastic strands from the melt are attached directly to the extruder apparatus and are subjected to high loads and wear. Consequently, most orifice plates consist of a base plate provided with melt inlet channels and wear-resistant hardenable inserts, in which bores are provided for melt discharge. These inserts are generally soldered in corresponding recesses in the base plate.

At present, these inserts are soldered into the base plate and then must be brought to an operational state by means of a corresponding heat treatment prior to the formation of the bores for melt discharge. After forming the bores for melt discharge a further heat treatment for hardening the insert is necessary.

These two heat treatments are expensive and in addition to them there is the great disadvantage that in order to drill the bores for melt discharge in the inserts, large processing units are required for relatively large orifice plates. Particular difficulties are encountered in forming melt discharge bores which extend at an angle relative to the longitudinal axis of the melt inlet channels in the base plate, as shown, for example, in DE 38 09 735.

SUMMARY OF THE INVENTION

An object of the invention is to provide a process for the manufacture of orifice plates provided with soldered inserts which can be carried out at a reduced cost.

The above and further objects of the invention are achieved by a process comprising forming a blind bore in the insert prior to insertion of the insert into a recess in the base plate, inserting the insert into the recess of the base plate so that the blind bore communicates with a melt channel in the base plate and a solid outer face of the insert is exposed at said recess, said blind bore terminating in proximity to said outer face, fixing the insert in said recess and hardening the insert, and removing material from the insert at said outer face to expose the blind bore at said outer face.

This process makes possible the formation of melt discharge bores in the wear-resistant inserts of the orifice plate at reduced cost because the blind bores can be formed in the individual inserts at small processing stations while the inserts are in a soft, unhardened state. The process is particularly advantageous when the melt discharge bores extend at an angle relative to the longitudinal axis of the melt channel in the base plate.

The inserts are preferably fixed in the recesses by soldering and it is an advantage of the invention that the soldering operations can be carried out at soldering stations.

In another advantageous feature of the invention, considerable reduction in the time of heat treatment as well as considerable energy savings can be effected by soldering the inserts in the recesses and hardening the inserts in a single passage through an oven.

According to another feature of the invention, when the melt discharge bores in the inserts are of small diameter, i.e. less than 1 mm diameter, they can be formed by chemical erosion.

According to another feature of the invention, when the inserts are relatively large in diameter it is advantageous for the inserts to be threadably engageable in the base plate before they are soldered in place.

DETAILED DESCRIPTION OF A PREFERRED EMBODIMENT

Figure 1:
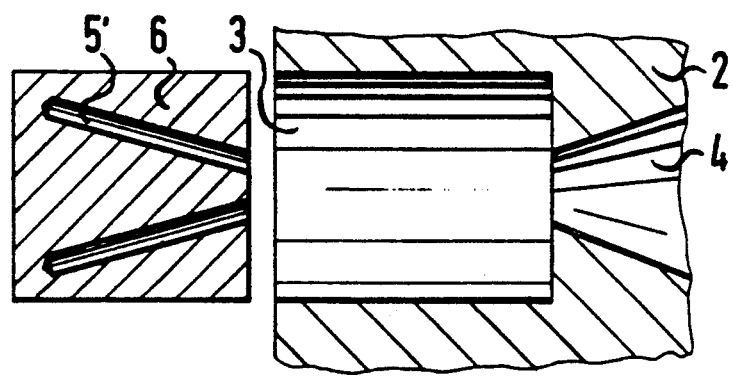
FIG. 1 is a sectional view showing an insert provided with blind bores prior to its introduction into the recess of a base plate of an orifice plate.

The figures of the drawing show only a small portion of an orifice plate 1 which is conventionally attached to an extruder (not shown) to divide an extruded melt into a plurality of strings. A cutting means (also not shown) acts on the strings to cut the same into pellets. In a typical orifice plate, there is a base plate 2 which is provided with a large number of recesses 3 distributed on concentric circles on the plate 2. The recesses 3 are cylindrical and receive respective inserts 6 of corresponding shape. The inserts 6 can be threaded into the recesses.

The base plate 2 has a conical melt channel 4 which opens into the recess 3. Molten plastic from the extruder is fed to the melt channel 4 and then to the inserts 6 in the recesses 3 for external discharge. The inserts contain bores 5 (FIG. 3) for conveying the plastic melt from the melt channels 4 for external discharge. The bores 5 extend at an angle relative to the longitudinal axis of the melt channel 4.

The insert 6 is initially formed, as seen in FIG. 1, with blind bores 5' which extend from inner surface 8 of the insert to a location in proximity to solid outer surface 9 of the insert. The blind bores 5' are formed in the inserts 6 on small machine units while the inserts 6 are in an unhardened state. If the blind bores are of a diameter less than 1 mm, they are preferably formed by chemical erosion. When the insert 6 is inserted into the recess 3 the blind bores 5' communicate with the melt channel 4. The insert 6 is fixed in the recesses, for example, by soldering, welding or adhesives. Preferably the insert is soldered in the recess and the soldering operation and hardening of the insert by heat treatment is carried out by a single passage through an oven.

Figure 2:
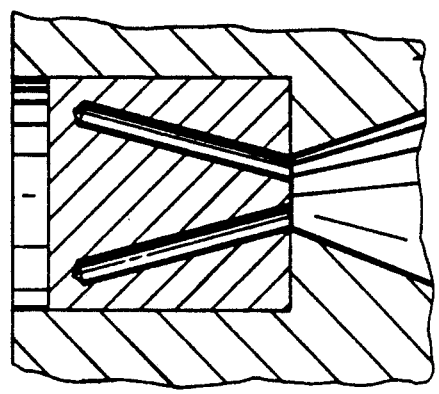
FIG. 2 shows the insert after introduction into the recess.
Figure 3:
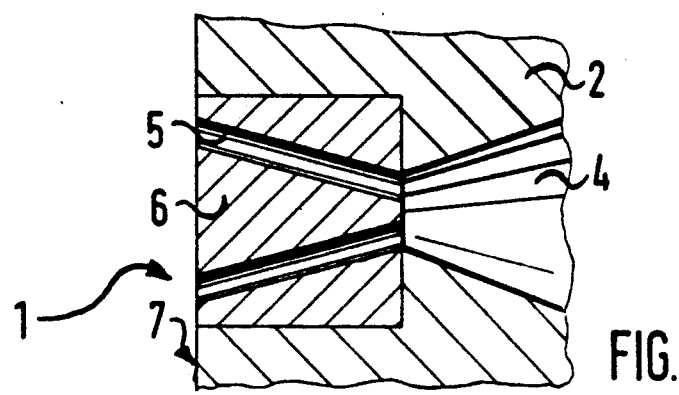
FIG. 3 shows the insert in the base plate after grinding to expose the blind bores at the outer face of the orifice plate.

After soldering and hardening, the front surface 7 of the orifice plate is machined, by grinding, to expose the blind bores at the surface 7 as shown in FIG. 3. Material is removed during the grinding operation from the base plate 2 and from the insert 6 so that surface 7 is planar and continuous over the base plate and the inserts. As shown in FIG. 2, the insert 6 is recessed in the recess 3, which facilitates the soldering operation, but after the grinding operation the outer surface of the insert 6 is disposed in the same plane as the outer surface 10 of the base plate 2.

The process according to the invention is not only cost favorable, but it is also characterized by a great flexibility. Semi-finished inserts (provided with blind bores) of various sizes can be specified beforehand for different plastic melts and then inserted as required in a short time into the base plate 2.

Although the invention has been described with reference to one embodiment thereof, it will become evident to those skilled in the art that numerous modifications and variations can be made in the scope and spirit of the invention as defined in the attached claims.

What is claimed is:

1. In a process for producing an orifice plate for pelletizing a plastic melt in which an insert is fixed in a recess in a base plate and melt flows through a melt channel in the base plate and then through a bore in the insert for discharge at an outer surface of the insert, the improvement comprising forming a blind bore in the insert prior to insertion of the insert into a recess in a base plate, inserting the insert into the recess of the base plate so that the blind bore communicates with a melt channel in the base plate and a solid, outer face of the insert is exposed at said recess, said blind bore terminating in proximity to said outer face, fixing the insert in said recess and hardening the insert, and removing material from the insert at said outer face to expose the blind bore at said outer face.

2. The improvement as claimed in claim 1, wherein said material is removed at said outer face by machining said outer face.

3. The improvement as claimed in claim 2, wherein said machining of said outer face comprises grinding said outer face.

4. The improvement as claimed in claim 3, wherein said fixing of the insert in said recess and said hardening of the insert are effected in a single operation.

5. The improvement as claimed in claim 4, wherein said single operation comprises heating the insert and base plate in an oven.

6. The improvement as claimed in claim 1, wherein the formation of the blind bore is effected by chemical erosion.

7. The improvement as claimed in claim 1, wherein the fixing of the insert in the base plate is effected by soldering.

8. The improvement as claimed in claim 1, wherein said insert is inserted into the recess in the base plate by threadably engaging the insert in the recess in the base plate.

9. The improvement as claimed in claim 1, wherein said bore in the insert extends at an angle relative to the longitudinal axis of the melt channel in the base plate.

10. The improvement as claimed in claim 9, wherein a plurality of bores are provided in the insert, each extending at an angle relative to the longitudinal axis of the melt channel.

11. The improvement as claimed in claim 1, comprising removing material from the base plate in concert with the removal of material from the outer face of the insert to form an outer flat surface for the orifice plate.

12. The improvement as claimed in claim 11, wherein the removal of material from the base plate and from the insert is effected by grinding.

13. The improvement as claimed in claim 1, wherein the insert is recessed in the recess in the base plate and material is removed by grinding the base plate and the insert to form an outer planar surface at which the bore in the insert is open.

* * * * *